(12) United States Patent
Border et al.

(10) Patent No.: US 8,593,564 B2
(45) Date of Patent: Nov. 26, 2013

(54) DIGITAL CAMERA INCLUDING REFOCUSABLE IMAGING MODE ADAPTOR

(75) Inventors: John Norvold Border, Walworth, NY (US); Richard D. Young, Fairport, NY (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/239,472

(22) Filed: Sep. 22, 2011

(65) Prior Publication Data

US 2013/0076930 A1    Mar. 28, 2013

(51) Int. Cl.
*H04N 5/225* (2006.01)

(52) U.S. Cl.
USPC .......................................... 348/360; 348/340

(58) Field of Classification Search
USPC ............... 348/360, 345, 207.99, 340, 361
See application file for complete search history.

(56) References Cited

U.S. PATENT DOCUMENTS

| | | | |
|---|---|---|---|
| 3,971,065 A | 7/1976 | Bayer | |
| 4,642,678 A | 2/1987 | Cok | |
| 4,774,574 A | 9/1988 | Daley et al. | |
| 5,189,511 A | 2/1993 | Parulski et al. | |
| 5,282,045 A | 1/1994 | Mimura | |
| 5,493,335 A | 2/1996 | Parulski et al. | |
| 5,652,621 A | 7/1997 | Adams, Jr. et al. | |
| 5,668,597 A | 9/1997 | Parulski et al. | |
| 5,883,695 A | 3/1999 | Paul | |
| 6,192,162 B1 | 2/2001 | Hamilton, Jr. et al. | |
| 6,292,218 B1 | 9/2001 | Parulski et al. | |
| 6,934,056 B2 | 8/2005 | Gindele et al. | |
| 7,542,077 B2 | 6/2009 | Miki | |
| 7,723,662 B2 * | 5/2010 | Levoy et al. ............... 250/208.1 |
| 7,847,837 B2 | 12/2010 | Ootsuna | |
| 7,936,392 B2 | 5/2011 | Ng et al. | |
| 7,965,936 B2 * | 6/2011 | Raskar et al. ................. 396/268 |
| 2007/0024931 A1 | 2/2007 | Compton et al. | |
| 2007/0252074 A1 * | 11/2007 | Ng et al. ..................... 250/208.1 |
| 2008/0309813 A1 * | 12/2008 | Watanabe ...................... 348/340 |
| 2010/0026852 A1 | 2/2010 | Ng et al. | |
| 2010/0128145 A1 | 5/2010 | Pitts | |

FOREIGN PATENT DOCUMENTS

JP            2006078713            3/2006

OTHER PUBLICATIONS

Ng et al., "Light field photography with a hand-held plenoptic camera," Stanford Tech Report CTSR Feb. 2005.
Search Report and Written Opinion received in corresponding PCT Application No. PCT/US2012/055410, dated Mar. 28, 2013.

* cited by examiner

*Primary Examiner* — James M Hannett
*Assistant Examiner* — Ahmed A Berhan
(74) *Attorney, Agent, or Firm* — Wong, Cabello, Lutsch, Rutherford & Brucculeri, LLP

(57) ABSTRACT

A digital camera system configurable to operate in a low-resolution refocusable mode and a high-resolution non-refocusable mode comprising: a camera body; an image sensor mounted in the camera body having a plurality of sensor pixels for capturing a digital image; an imaging lens for forming an image of a scene onto an image plane, the imaging lens having an aperture; and an adaptor that can be inserted between the imaging lens and the image sensor to provide the low-resolution refocusable mode and can be removed to provide the high-resolution non-refocusable mode, the adaptor including a microlens array with a plurality of microlenses; wherein when the adaptor is inserted to provide the low-resolution refocusable mode, the microlens array is positioned between the imaging lens and the image sensor.

15 Claims, 10 Drawing Sheets

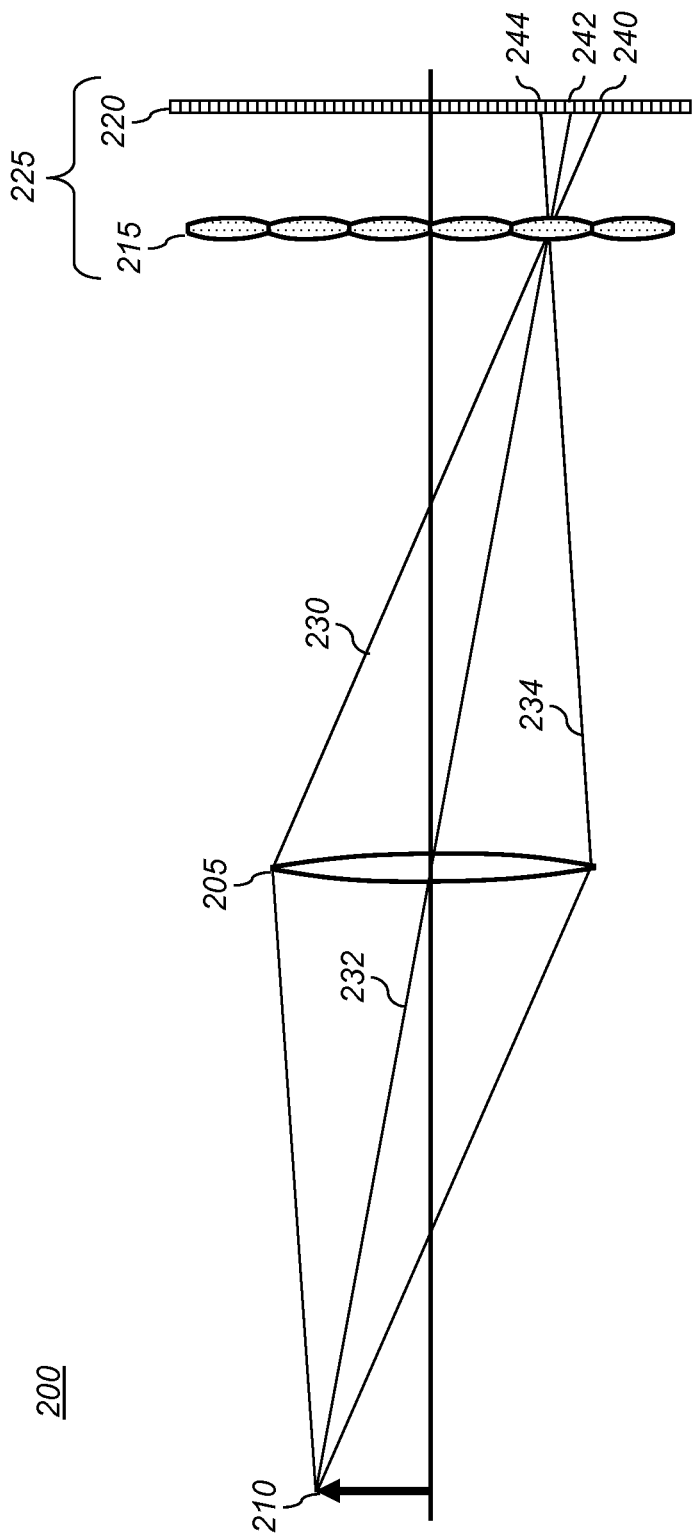

DIGITAL CAMERA INCLUDING REFOCUSABLE IMAGING MODE ADAPTOR

CROSS-REFERENCE TO RELATED APPLICATIONS

Reference is made to co pending U.S. patent application Ser. No. 13/239,463, entitled: "Digital imaging system with refocusable imaging mode", by Border et al.; and to co pending U.S. patent application Ser. No. 13/239,479, entitled: "Plenoptic lens unit providing refocusable imaging mode", by Border et al., both of which are incorporated herein by reference.

FIELD OF THE INVENTION

This invention pertains to the field of digital cameras and more particularly to digital cameras that employ a plenoptic imaging system to provide a refocusable mode after image capture.

BACKGROUND OF THE INVENTION

Plenoptic cameras have recently been developed as a method to capture an image of a scene that can be refocused after image capture using appropriate image processing. FIG. 3 illustrates a configuration for a plenoptic camera 200 as described in U.S. Pat. No. 7,936,392 to Ng et al., entitled "Imaging arrangements and methods therefor," The plenoptic camera 200 includes a microlens array 215 positioned between a main imaging lens 205 and a sensor array 220.

To enable plenoptic imaging, the imaging lens 205 is focused so that the image plane (corresponding to nominal object plane 210) is located at the plane of the microlens array 215. The sensor array 220 is positioned so that each of the individual microlenses in the microlens array 215 forms an image of the aperture of the imaging lens 205 on the sensor array 220. It can be seen that each pixel of the sensor array 220 therefore senses the imaging light falling on the microlens array 215 at a particular position (corresponding to the position of the corresponding microlens) from a particular direction (corresponding to the portion of the imaging lens aperture that is imaged onto that pixel). For example, the imaging light for imaging rays 230, 232 and 234 will be captured by sensor pixels 240, 242 and 244, respectively. The combination of the microlens array 215 and the sensor array 220 can therefore be viewed as a ray sensor 225 that provides information about the intensity about the rays falling on the ray sensor as a function of position and incidence angle.

Ray sensor images captured by the ray sensor 225 can be processed to provide a refocusable imaging mode wherein refocused images corresponding to different focus settings are assembled by combining pixels corresponding to the appropriate imaging rays. This is illustrated in FIGS. 4A-4C.

In FIG. 4A, the desired focus setting corresponds to the original focus setting of the imaging lens 205. In this case, the imaging rays that should be combined to determine the image pixel value for pixel position 250 are shown by ray bundle 252. This corresponds to the trivial case where the rays that would be combined for a particular pixel position are the rays falling on a corresponding microlens in the microlens array 215. It can be seen that the spatial resolution of the refocused image is therefore limited to the spatial resolution of the microlens array 215.

FIG. 4B illustrates the case where a refocused image is determined corresponding to an object plane that is farther away from the plenoptic camera 200 (FIG. 3) than the nominal object plane 210 (FIG. 3). The goal is to determine the image that would have been sensed if an image sensor had been placed at a virtual sensor location 264. In this case, the imaging rays that should be combined for pixel position 250 are shown by ray bundle 254. It can be seen that these imaging rays fall onto the ray sensor 225 at a variety of different spatial positions and angles. The pixel value for the pixel position 250 in the refocused image is determined by combining the pixels in the captured ray sensor image corresponding to the imaging rays in the ray bundle 254.

Similarly, FIG. 4C illustrates the case where a refocused image is determined corresponding to an object plane that is closer to the plenoptic camera 200 (FIG. 3) than the nominal object plane 210 (FIG. 3), having a corresponding virtual sensor location 266. In this case, the imaging rays that should be combined for pixel position 250 are shown by ray bundle 256. In this case, the pixel value for the pixel position 250 in the refocused image is determined by combining the pixels in the captured ray sensor image corresponding to the imaging rays in the ray bundle 256.

With conventional digital camera systems, if a focus error was made during image capture so that the scene object of interest is out of focus, there is no way to correct the focus error post capture. An advantage of the plenoptic imaging system of FIG. 3 is that the focus position of a captured image can be adjusted at a later time after the image has been captured. For example, a user interface can be provided that enables a user to evaluate refocused image corresponding to different focus positions and save the refocused image corresponding to the preferred focus position. However, a disadvantage of plenoptic cameras is that the refocused images necessarily have a substantially lower spatial resolution that the native spatial resolution of the sensor array 220. This reduction in resolution is typically by a factor of 16× to 36×. As a result, the image quality of the refocused image will be significantly lower than a properly focused image captured using a conventional digital camera system using the same sensor array 220.

U.S. Patent Application Publication 2010/0026852 to Ng et al., entitled "Variable imaging arrangements and methods therefor," provides a method for switching between a low resolution refocusable mode and a higher resolution mode. The method is based on moving the imaging sensor closer to the microlens array. However, even when the imaging sensor is in direct contact with the microlenses, the microlenses will still impart artifacts to the captured image that effectively reduces the resolution of the captured image. For example, the intersection lines between the microlenses will impart repetitive aberrations in the captured image and the thickness of the microlens array will make it impossible to position the sensor at the focus plane of the main lens.

There remains a need for a method to enable a camera system to be switched or changed between a low resolution refocusable mode and a high resolution non-refocusable mode.

SUMMARY OF THE INVENTION

A digital camera system configurable to operate in a low-resolution refocusable mode and a high-resolution non-refocusable mode comprising:

a camera body;

an image sensor mounted in the camera body having a plurality of sensor pixels for capturing a digital image;

an imaging lens for forming an image of a scene onto an image plane, the imaging lens having an imaging lens aperture; and an adaptor that can be inserted between the imaging lens and the image sensor to provide the low-resolution refocusable mode and can be removed to provide the high-resolution non-refocusable mode, the adaptor including a microlens array with a plurality of microlenses;

wherein when the adaptor is inserted to provide the low-resolution refocusable mode, the microlens array is positioned between the imaging lens and the image sensor.

This invention has the advantage that the digital camera system can be configured to capture both low-resolution refocusable digital images and high-resolution non-refocusable digital images.

It has the additional advantage that the adaptor of the present invention can be used to retrofit a conventional digital camera to enable it to capture low-resolution refocusable digital images.

It has the further advantage that the low-resolution refocusable digital images can be used to form refocused images corresponding to a user-specified virtual image plane.

BRIEF DESCRIPTION OF THE DRAWINGS

FIG. 3 is a schematic drawing of an optical system for a prior art plenoptic camera;

It is to be understood that the attached drawings are for purposes of illustrating the concepts of the invention and may not be to scale.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 1:
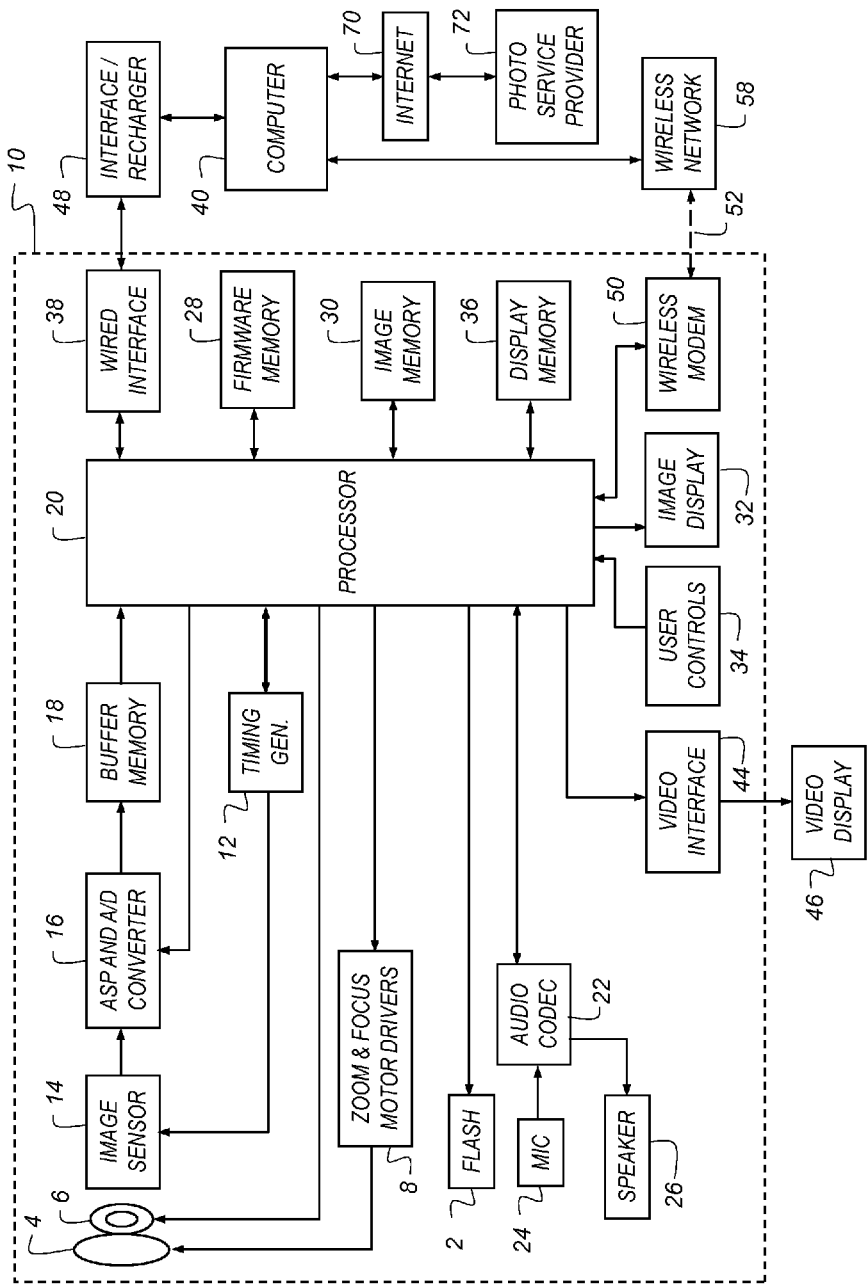
FIG. 1 is a high-level diagram showing the components of a digital camera system.

FIG. 1 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drives 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 1 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD card or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, "Color imaging array" to Bayer, the disclosure of which is incorporated herein by reference. As a second example, the different color pixels can be arranged as described in commonly assigned U.S. Patent Application Publication 2007/0024931 to Compton and Hamilton, entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 1, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixels values, or by combining some color pixels values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene.

The lens 4 of the digital camera 10 can be focused in the first mode by using "through-the-lens" autofocus, as described in commonly-assigned U.S. Pat. No. 5,668,597, entitled "Electronic Camera with Rapid Automatic Focus of an Image upon a Progressive Scan Image Sensor" to Parulski et al., which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images, recording of motion images. The user controls 34 are also used to set user processing preferences, and to choose between various photography modes based on scene type and taking conditions. In some embodiments, various camera settings may be set automatically in response to analysis of preview image data, audio signals, or external signals such as GPS, weather broadcasts, or other available signals.

In some embodiments, when the digital camera is in a still photography mode the above-described preview mode is initiated when the user partially depresses a shutter button, which is one of the user controls 34, and the still image capture mode is initiated when the user fully depresses the shutter button. The user controls 34 are also used to turn on the camera, control the lens 4, and initiate the picture taking process. User controls 34 typically include some combination of buttons, rocker switches, joysticks, or rotary dials. In some embodiments, some of the user controls 34 are provided by using a touch screen overlay on the image display 32. In other embodiments, the user controls 34 can include a means to receive input from the user or an external device via a tethered, wireless, voice activated, visual or other interface. In other embodiments, additional status displays or images displays can be used.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be used to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also provides additional processing of the image data from the image sensor 14, in order to produce rendered sRGB image data which is compressed and stored within a "finished" image file, such as a well-known Exif-JPEG image file, in the image memory 30.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a set of rechargeable batteries (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak EasyShare Gallery. Other devices (not shown) can access the images stored by the photo service provider 72.

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 2:
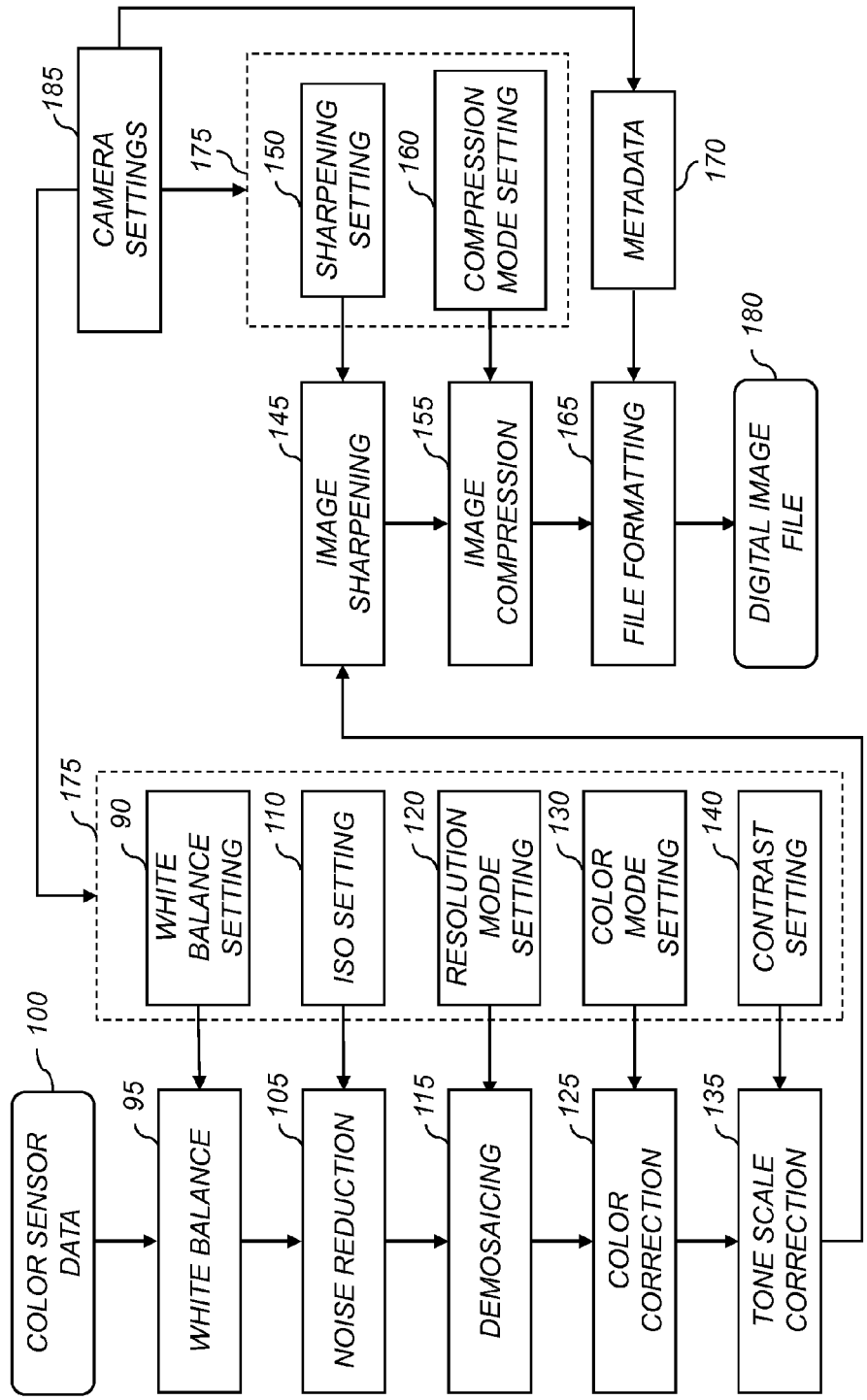
FIG. 2 is a flow diagram depicting typical image processing operations used to process digital images in a digital camera.

FIG. 2 is a flow diagram depicting image processing operations that can be performed by the processor 20 in the digital camera 10 (FIG. 1) in order to process color sensor data 100 from the image sensor 14 output by the ASP and A/D converter 16. In some embodiments, the processing parameters used by the processor 20 to manipulate the color sensor data 100 for a particular digital image are determined by various photography mode settings 175, which are typically associated with photography modes that can be selected via the user controls 34, which enable the user to adjust various camera settings 185 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Miki, entitled "White balance adjustment device and color identification device", the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621, entitled "Adaptive color plane interpolation in single sensor color electronic camera," to Adams et al., the disclosure of which is incorporated herein by reference. The demosaicing step 115 can also use the chrominance CFA interpolation method described in commonly-assigned U.S. Pat. No. 4,642,678, entitled "Signal processing method and apparatus for producing interpolated chrominance values in a sampled color image signal", to Cok, the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335, entitled "Single sensor color camera with user selectable image record size," to Parulski et al., the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511, entitled "Method and apparatus for improving the color rendition of hardcopy images from electronic cameras" to Parulski, et al., the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135.

The color image data is also manipulated by an image sharpening step 145. In some embodiments, this can be provided using the methods described in commonly-assigned U.S. Pat. No. 6,192,162 entitled "Edge enhancing colored digital images" to Hamilton, et al., the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574, entitled "Adaptive block transform image coding method and apparatus" to Daly et al., the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about various camera settings 185, including the photography mode settings 175.

The present invention will now be described with reference to FIGS. 5 and 6, which show schematic drawings of a digital imaging system 400 according to a first embodiment of the invention that includes a switchable optical module 445. A sensor array 420 is positioned within a camera body 405. (The sensor array 420 is equivalent to the image sensor 14 of FIG. 1.) An imaging lens 410 includes one or more lens elements 425 positioned within a lens body 415, and is used to form an image of a scene onto an image plane. (The imaging lens 410 is equivalent to the lens 4 of FIG. 1.)

The switchable optical module 445 includes a microlens array 430 and a glass plate 440, attached to a mounting bracket 435. The switchable optical module 445 can be moved back and forth in a lateral direction to position either the microlens array 430 or the glass plate 440 in the optical path of the imaging lens 410.

The glass plate 440 is sized to cover the entire sensor array 420 (i.e., the size of the glass plate 440 is greater than or equal to the size of the sensor array 420). Likewise, the microlens array 430 is also sized to cover the entire sensor array 420 (i.e., the size of the microlens array 430 is greater than or equal to the size of the sensor array 420). The microlens array 430 includes an array of individual microlenses, each microlens being sized to cover a plurality of sensor pixels in the sensor array 420 (i.e., the size of the microlens corresponds to a plurality of sensor pixels).

For purposes of illustration, the microlens array 430 and the sensor array 420 are shown with a relatively small number of microlenses and sensor pixels, respectively. In actual embodiments, the sensor array 420 will typically have millions of sensor pixels (e.g., 4088×3040 sensor pixels=12.4 megapixels), and each microlens in the microlens array 430 will typically be sized to correspond to an array of between about 4×4 to 10×10 sensor pixels.

Figure 5:
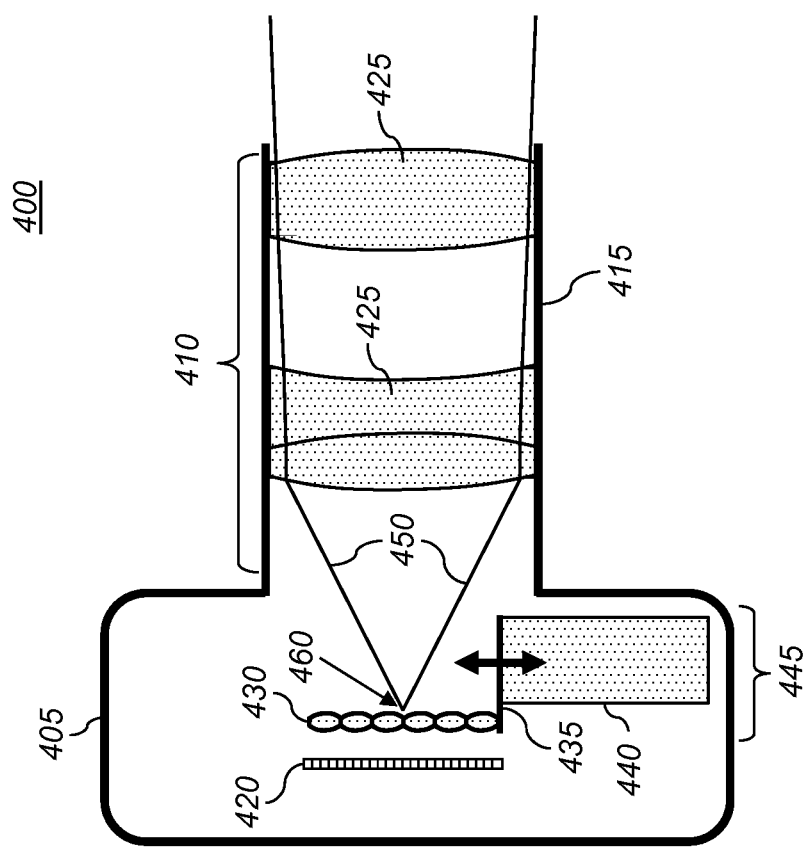
FIG. 5 is a schematic drawing showing a cross-section of a digital imaging system including switchable optical module according to a first embodiment, wherein the switchable optical module is positioned to provide a low resolution refocusable imaging mode.

In FIG. 5, the switchable optical module 445 is configured such that the microlens array 430 is positioned between the imaging lens 410 and the sensor array 420 to provide a low-resolution refocusable imaging mode. In the low-resolution refocusable imaging mode, the imaging lens 410 forms an image of the scene onto an image plane that is substantially coincident with the microlens array 430, as illustrated by light rays 450 coming to a focus point 460. Each of the microlenses in the microlens array 430 forms an image of the aperture of the imaging lens 410 onto a corresponding block of sensor pixels in the sensor array 420. This arrangement is analogous to the plenoptic imaging system configuration shown in FIG. 3. It can be seen that each sensor pixel in the sensor array 420 senses the imaging light falling on the microlens array 430 at a particular position (corresponding to the position of the corresponding microlens) from a particular direction (corresponding to the portion of the imaging lens aperture that is imaged onto that sensor pixel). The combination of the sensor array 420 and the microlens array 430 therefore provides the function of a "ray sensor" that senses light intensity as a function of position and incidence angle. The spatial resolution of images captured in the low-resolution refocusable imaging mode will be given by the resolution of the microlens array 430.

Figure 6:
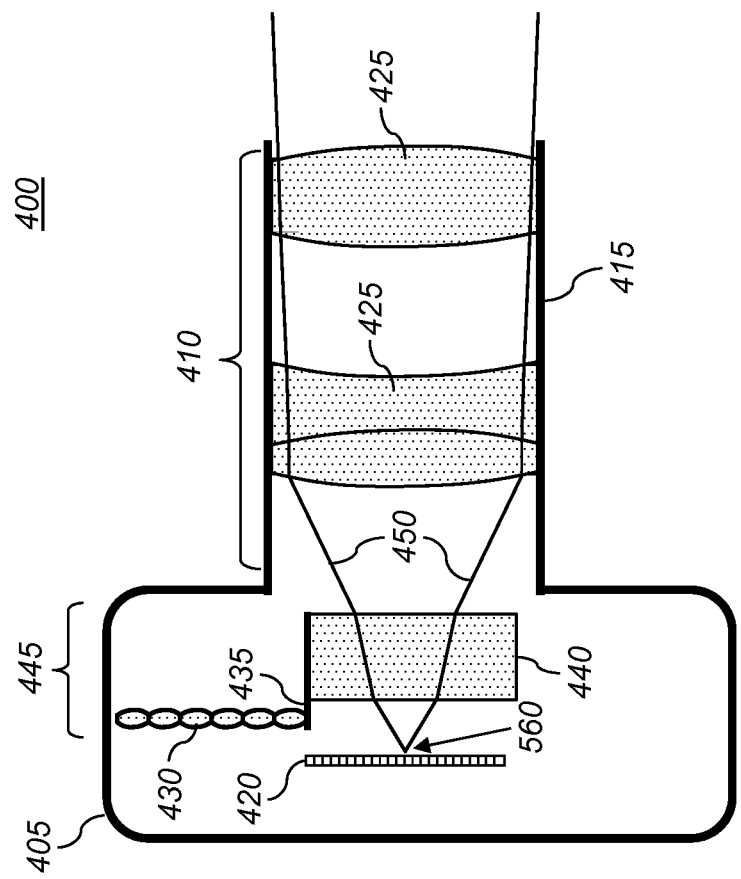
FIG. 6 is a schematic drawing showing a cross-section of the digital imaging system of FIG. 5 wherein the switchable optical module is positioned to provide a high resolution non-refocusable imaging mode.

In FIG. 6, the switchable optical module 445 is reconfigured such that the glass plate 440 is positioned between the imaging lens 410 and the sensor array 420 to provide a high-resolution non-refocusable imaging mode. In the high-resolution non-refocusable imaging mode, the light rays 450 are redirected by the glass plate to a focus point 560 on the sensor array 420, such that an image of the scene is formed on the sensor array 420. The spatial resolution of images captured in this mode will be given by the native resolution of the imaging sensor.

The index of refraction and thickness of the glass plate 440 are selected to shift the location of the image plane from the focus point 460 in FIG. 5 to the focus point 560 in FIG. 6. This distance will be approximately equal to the focal length of the microlenses in the microlens array 430. Consider the case where the microlenses in the microlens array 430 have a focal length of $f_m$=500 μm. If the glass plate 440 is made using a glass having an index of refraction of n=1.5, then it can be shown that the required thickness of the glass plate, t, will be approximately:

$$t \approx \frac{nf_m}{(n-1)} = \frac{1.5 \times 500 \text{ μm}}{(1.5-1)} = 1500 \text{ μm} = 1.5 \text{ mm} \quad (5)$$

In order to keep the thickness of the glass plate relatively small, it will generally be desirable that the glass plate 440 have a relatively high refractive index of refraction.

In the embodiment illustrated in FIGS. 5 and 6, the microlens array 430 and the glass plate 440 are connected using the mounting bracket 435 so that they slide together between the illustrated positions. In this way, when the user selects the low-resolution refocusable mode the switchable optical module 445 can be slid into the position shown in FIG. 5 where the microlens array 430 is positioned in the optical path of the imaging lens 410, and when the user selects the high-resolution non-refocusable mode the switchable optical module 445 can be slid into the position shown in FIG. 6 where the glass plate 440 is positioned in the optical path of the imaging lens 410.

The switchable optical module 445 can be slid back and forth between the different positions using any method known in the art. In a preferred embodiment the switchable optical module 445 is automatically repositioned in response to user activation of a user interface control. For example, the switchable optical module 445 can be automatically repositioned using an electric motor (combined with appropriate gears and other mechanical components). In other embodiments, the switchable optical module 445 can be manually repositioned using a user operable mechanism such as a lever or a mechanical slider.

In other embodiments, the switchable optical module 445 can reposition the microlens array 430 and the glass plate 440 using a method other than a sliding mechanism. For example, the microlens array 430 and the glass plate 440 can be attached to a rotatable bracket that can be rotated to move the appropriate component into the optical path of the imaging lens 410.

In an alternate embodiment, the microlens array 430 and the glass plate 440 are not attached to each other or to a common mounting bracket 435. Rather, a means can be provided so that they can be independently removed and inserted (either automatically or manually). For example, a first module including the microlens array 430 can be removed from the optical path and a second module including the glass plate 440 can be inserted into the optical path.

Figure 7:
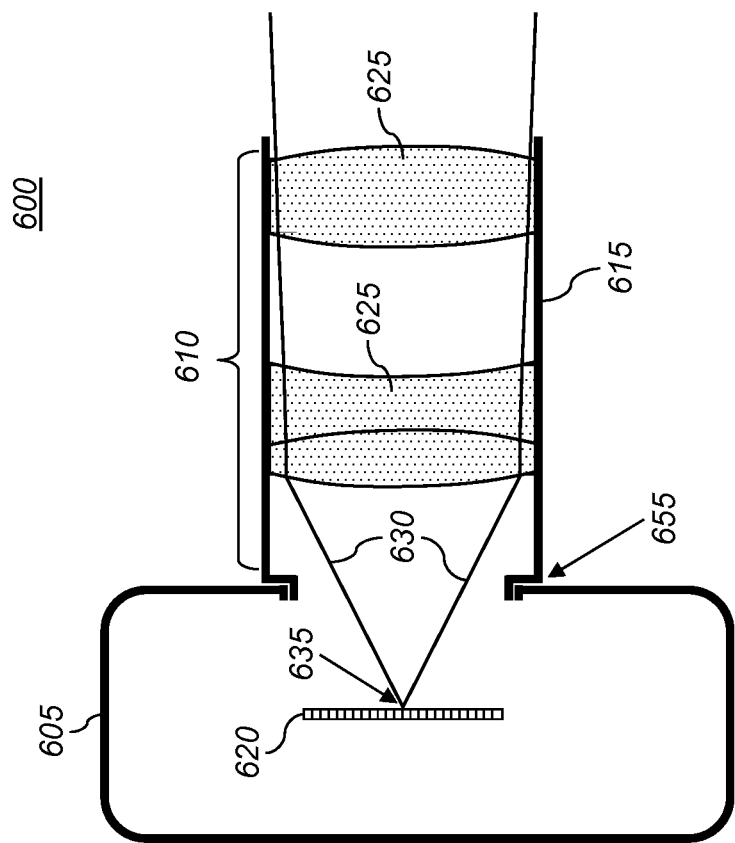
FIG. 7 is a schematic drawing showing a cross-section of a prior art digital camera system including a camera body and a removable imaging lens.
Figure 9:
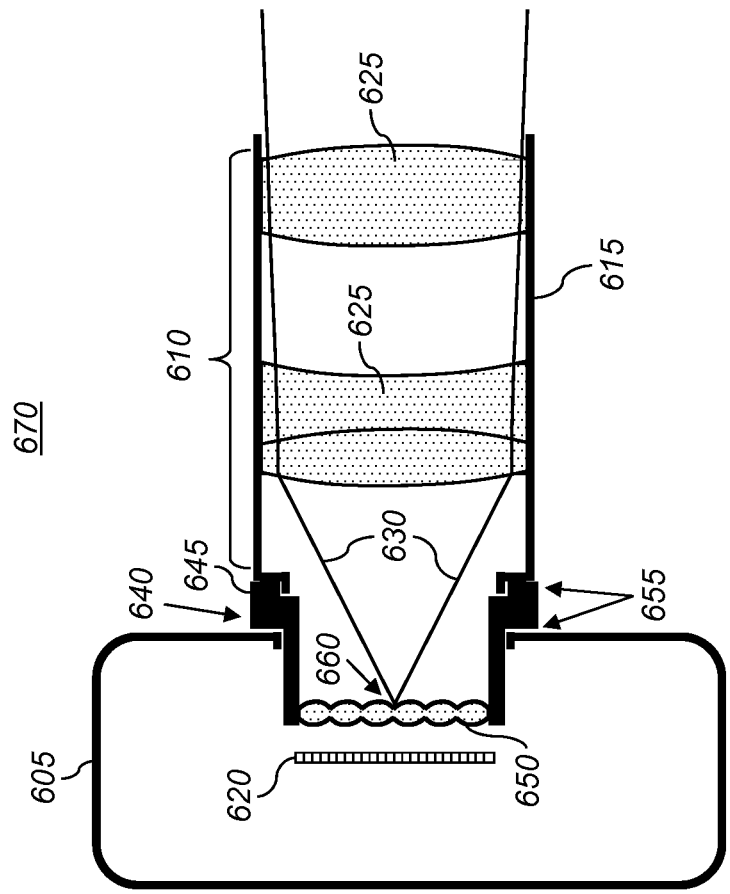
FIG. 9 is a schematic drawing showing the adaptor of FIG. 8 inserted between the camera body and the removable imaging lens of FIG. 7.
Figure 8:
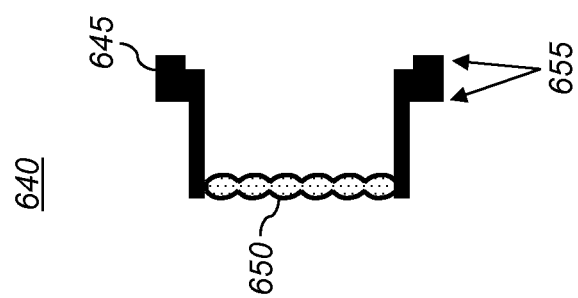
FIG. 8 is a schematic drawing showing a cross-section of an adaptor that can be inserted between the camera body and the removable imaging lens of FIG. 7 to provide a low-resolution refocusable imaging mode.

FIGS. 7-9 show schematic drawings for another embodiment of the invention that makes use of a plenoptic adaptor 640, which can be used in combination with a conventional digital camera having a removable imaging lens 610.

FIG. 7 illustrates a conventional digital imaging system 600, which includes sensor array 620 positioned within a camera body 605. A removable imaging lens 610 includes one or more lens elements 625 mounted in a lens barrel 615, wherein the imaging lens 610 can be removed from the camera body 605. The imaging lens 610 focuses light rays 630 from the scene to a focus point 635 at an image plane that is substantially coincident with the sensor array 620, thereby forming an image of the scene on the sensor array 620. A lens mount interface 655 is provided to enable the imaging lens 610 to be removed from the camera body 605. This provides a mechanism for a user to select between different types of imaging lenses 610 (e.g., wide-angle, telephoto, zoom or macro) depending on the photographic situation. The lens mount interface 655 can use any type of lens mount mechanism known in the art. Common types of lens mount mechanisms include screw-threaded mechanisms, bayonet-type mechanisms and friction-lock-type mechanisms. Typically, many camera manufacturers utilize proprietary lens mount mechanisms so that lenses made by one manufacturer cannot be used with camera bodies made by another manufacturer.

FIG. 8 illustrates a plenoptic adaptor 640 including a microlens array 650 that can be inserted between the camera body 605 and the imaging lens 610 in the conventional digital imaging system 600 of FIG. 7 to provide the low-resolution refocusable imaging mode. In one embodiment, the plenoptic adaptor 640 includes two lens mount interfaces 655—one for connecting the plenoptic adaptor 640 to the camera body 605 and one for connecting the imaging lens 610 to the plenoptic adaptor 640. The lens mount interfaces 655 can be designed to work with the lens mounting systems used by any particular digital camera system of interest.

FIG. 9 illustrates a digital imaging system 670 where the plenoptic adaptor 640 of FIG. 8 is inserted between the camera body 605 and the imaging lens 610 in the digital imaging system 600 of FIG. 7. The plenoptic adaptor 640 is designed so that light rays 630 from the scene are focused onto an image plane (corresponding to focus point 660) that is substantially coincident with the microlens array 650. The plenoptic adaptor 640 is designed to position the microlens array 650 such that the individual microlenses form images of the aperture of the imaging lens 610 onto the sensor array 620. (Generally, the microlens array 650 should be positioned so that the spacing between the microlens array 650 and the sensor array 620 is approximately equal to the focal length of the lenslets.)

Use of the plenoptic adaptor 640 enables a conventional digital camera with a removable imaging lens 610 to be retrofitted to provide a low-resolution refocusable imaging mode similar to the prior art configuration shown in FIG. 3, and the embodiment of the invention shown in FIG. 5. When the user removes the plenoptic adaptor 640 and attaches the imaging lens 610 directly to the camera body 605, the digital imaging system 670 can be converted back to use the standard high-resolution non-refocusable imaging mode associated with the conventional digital imaging system 600 of FIG. 7.

Figure 10:
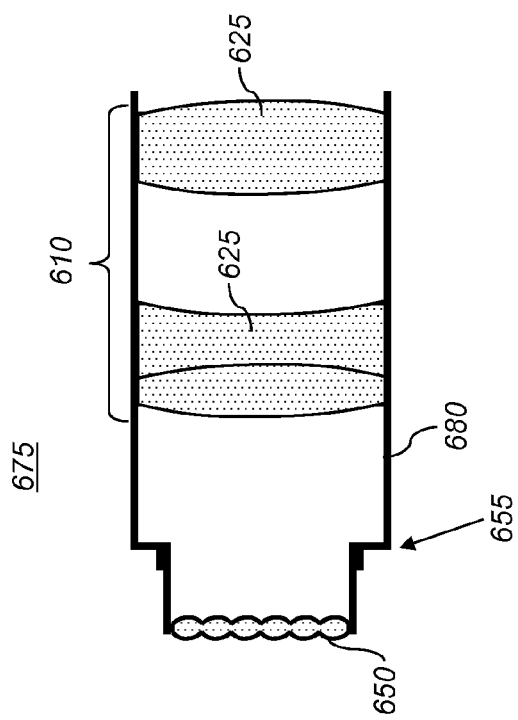
FIG. 10 is a schematic drawing showing a cross-section of a plenoptic imaging lens that can be used with a conventional camera body to provide a low-resolution refocusable imaging mode.

In some embodiments, the plenoptic adaptor 640 can be integrated together with the imaging lens 610 so that they form a single unit that is permanently joined together to form a plenoptic lens unit 675 as shown in FIG. 10. The plenoptic lens unit 675 includes an imaging lens 610 (having one or more lens elements 625) and a microlens array 650, integrated into a lens housing 680. A lens mount interface 655 is provided on the lens housing 680 to enable the plenoptic lens unit 675 to be mounted on a camera body 605 as shown by the digital imaging system 685 in FIG. 11. The camera body 605 includes a sensor array 620, as well as other components associated with a digital camera. The lens mount interface 655 can be provided so that the plenoptic lens unit 675 can be mounted on a particular commercially available digital camera, or can be a custom interface designed to mount on a specially designed digital camera.

The plenoptic lens unit 675 is designed so that light rays 630 from the scene are focused onto an image plane (corresponding to focus point 690) that is substantially coincident with the microlens array 650. The plenoptic lens unit 675 is designed to position the microlens array 650 such that the individual microlenses form images of the aperture of the imaging lens 610 onto the sensor array 620. (Generally, the microlens array 650 should be positioned so that the spacing between the microlens array 650 and the sensor array 620 is approximately equal to the focal length of the lenslets.)

Figure 11:
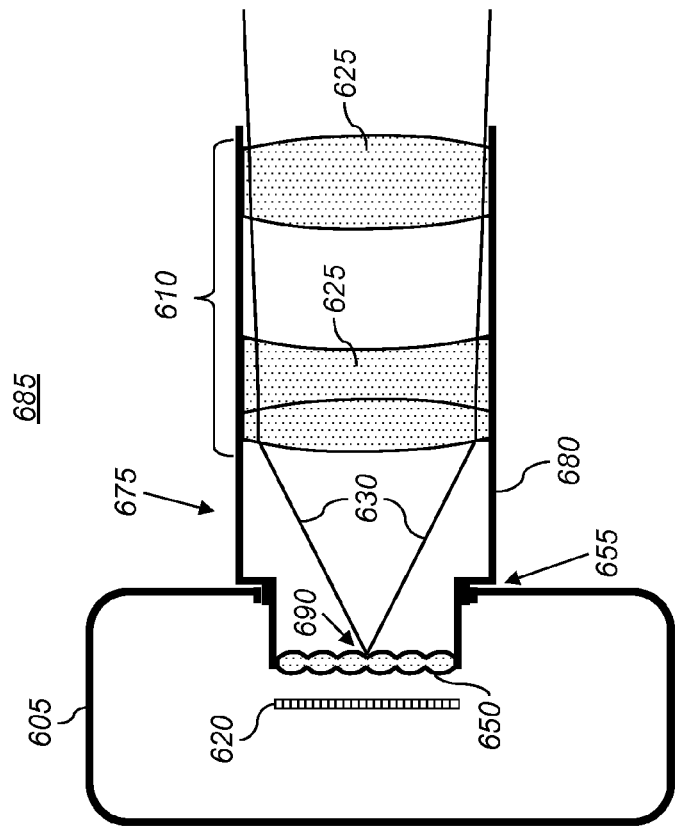
FIG. 11 is a schematic drawing of a digital imaging system using the plenoptic imaging lens of FIG. 10.

According to the configurations of FIGS. 10 and 11, the plenoptic lens unit 675 can be mounted on the camera body 605 when the user desires to capture images in the low-resolution refocusable imaging mode as shown by the digital imaging system 685 in FIG. 11. The plenoptic lens unit can then be removed and replaced with a conventional imaging lens when the user desires to capture images in the high-resolution non-refocusable imaging mode.

Digital single lens reflex (SLR) cameras are an example of one type of digital camera system that commonly uses removable imaging lenses 610. Typically, the SLR camera bodies include a movable mirror which can direct imaging light toward an optical viewfinder during the time that the user is composing the image. The mirror is then repositioned away from the optical path of the imaging lens 610 when the user activates the image capture control. To use such a camera with a plenoptic adaptor 640 as in FIG. 8, it may be necessary to use a special mirror lock mode where the mirror is locked in the picture taking mode. In this case, image data provided by the sensor array is used to provide a preview image on the image display 32 (FIG. 1) during the image composition process.

Digital cameras formed according to the above-described embodiments can be used by a user to capture images in either the low-resolution refocusable imaging mode or the high-resolution non-refocusable mode. Digital images captured by the user when the digital camera is set to operate in the high-resolution non-refocusable mode can be processed, stored and used just like any other digital image captured by a conventional digital camera system.

Digital images captured by the user when the digital camera is set to operate in the low-resolution refocusable imaging mode can be processed to obtain refocused digital images at having a selectable focus state. In some embodiments, a user interface can be provided as part of the digital camera that enables the user to select a focus state and preview the corresponding refocused image on the image display 32 (FIG. 1). When the user is satisfied with the results, the refocused image can be stored in a processor accessible memory. In some embodiments, the user can be enabled to compute and store a plurality of different refocused images corresponding to different focus states.

For embodiments, such as those shown in FIGS. 8-11, where a plenoptic adaptor 640 or a plenoptic lens unit 675 are used to provide a low-resolution refocusable imaging mode for a conventional digital camera, the firmware in the camera can be updated to provide the processing and user interface required to determine a refocused image from digital image data captured when the digital camera system is operating in the low-resolution refocusable imaging mode. For digital cameras that provide a real-time preview image on the image display 32 (FIG. 1), the firmware can also be updated to compute determine a preview image corresponding to a nominal focus state from the captured digital image data.

In other embodiments, captured images captured in the low-resolution refocusable imaging mode can be stored in a processor-accessible memory for processing at a later time. For example, the captured images can be stored in the image memory 30 (FIG. 1) and can be transferred to an external computer 40 (FIG. 1) for additional processing. A software application running on the computer 40 can then be used to perform the refocusing process. Alternatively, after the captured images are stored in the image memory 30 (FIG. 1), the images could be transferred via the internet to a cloud computing server (not shown) for additional processing. A software application running on the cloud computing server (not shown) can then be used to perform the refocusing process.

The process of determining a refocused image from a digital image captured when the digital image system is set to operate in the low-resolution refocusable imaging mode can use any method known in the art. One such method for determining refocused images is described in the article "Light field photography with a hand-held plenoptic camera," by Ng et al. (Stanford Tech Report CTSR 2005-02, 2005), which is incorporated herein by reference.

Figure 12:
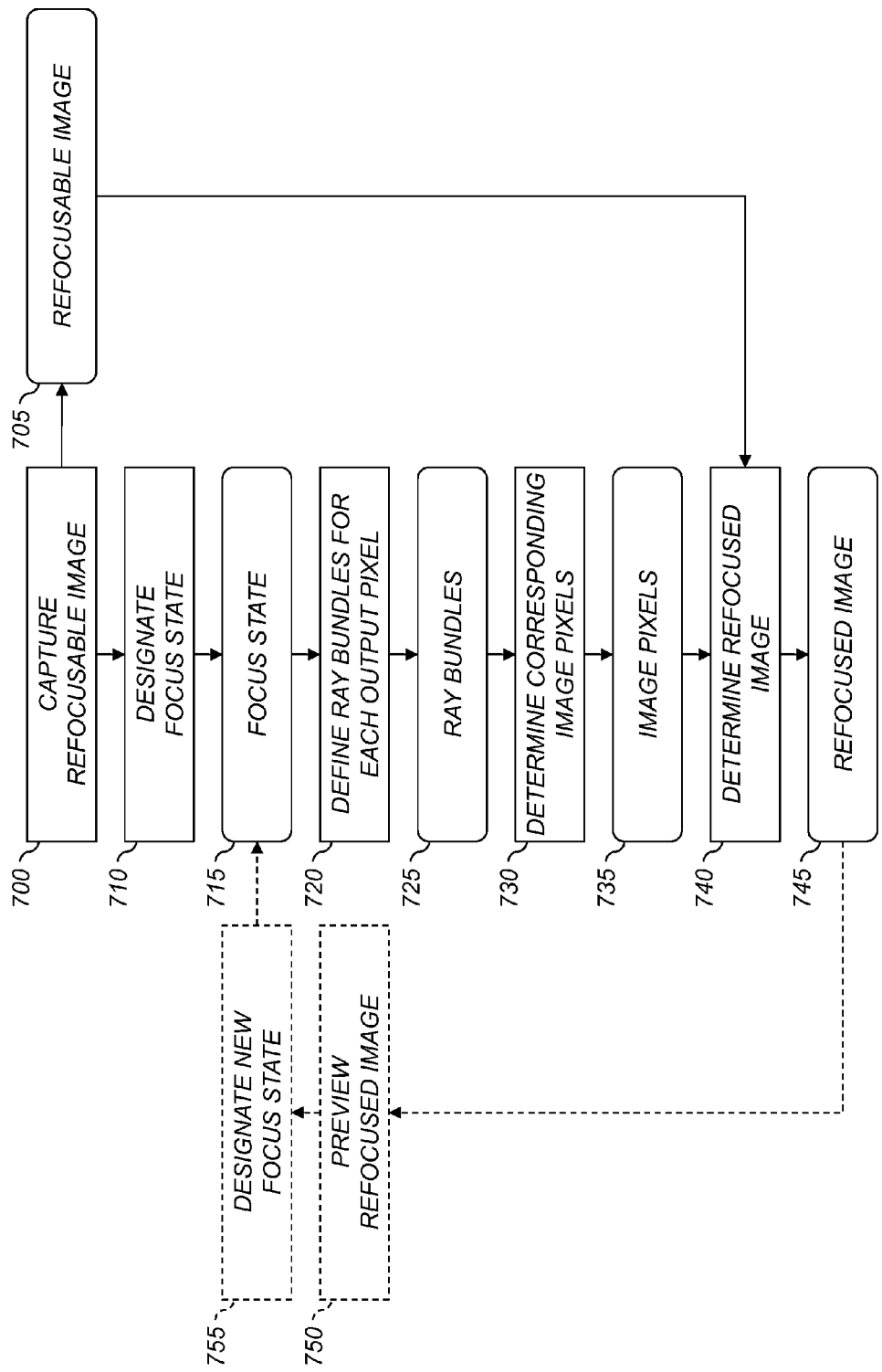
FIG. 12 is a flow chart showing a method for determining a refocused image in accordance with the present invention.

FIG. 12 shows a flow diagram of a method for determining a refocused image 745 according to a preferred embodiment. A capture refocusable image step 700 is used to capture a refocusable image 705 using a digital camera operating in low-resolution refocusable imaging mode. (For example, the refocusable image 705 can be captured using the digital imaging system 400 described earlier with reference to FIG. 5.)

The refocusable image 705 includes an array of images of the aperture of the imaging lens 410 (FIG. 5) formed by the microlens array 430 (FIG. 5). As discussed above, the aperture image formed by each microlens corresponds to a ray position, and each pixel in the aperture image corresponds to a different ray direction. In a preferred embodiment, the image sensor 14 (FIG. 1) used to capture the refocusable image 705 is a color image sensor incorporating a color filter array (CFA) pattern. In a preferred embodiment, the captured color sensor data 100 (FIG. 2) is processed with a series of processing steps including the demosaicing step 115 (FIG. 2) to form a full-color image that is used for the refocusable image 705. In some embodiments, the process of determining the refocused image 745 shown in FIG. 12 is inserted in the middle of the imaging chain shown in FIG. 2 (e.g., after the demosaicing step). In other embodiments, it can be performed to digital images that have been processed using the entire imaging chain of FIG. 2.

Figure 4A:
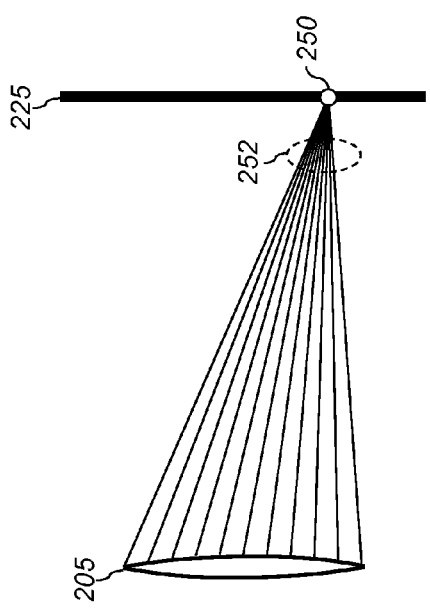
FIGS. 4A-4C illustrate ray bundles associated with different focus positions for the plenoptic camera of FIG. 3.
Figure 4C:
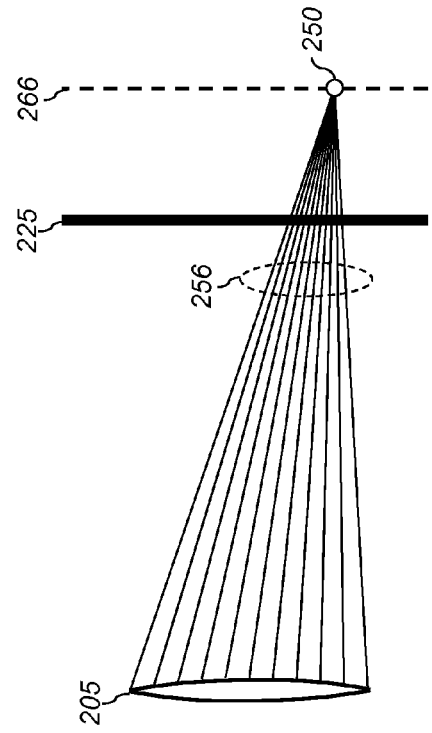
Figure 4B:
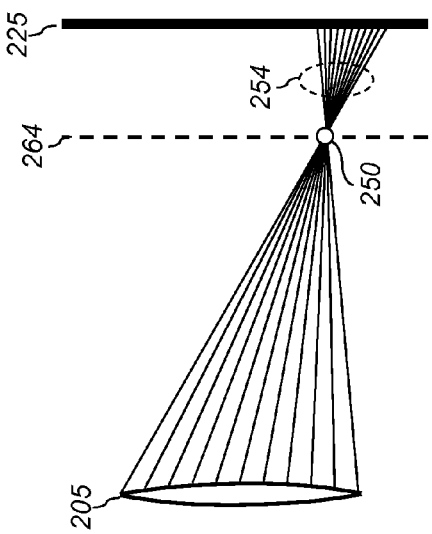

Returning to a discussion of FIG. 12, a designate focus state step 710 is used to designate a focus state 715. As was discussed relative to FIGS. 4A-4C, the designation of the focus state 715 typically includes the specification of a virtual image plane (i.e., a virtual sensor location) that should be used to determine the refocused image 745. In a preferred embodiment, the designate focus state step 710 provides a user interface that enables the user to interactively designate the focus state 715 and preview the refocused image 745. The user interface can utilize any type of user interface controls known in the art. For example, user interface buttons can be provided enabling the user to increment or decrement the location of the virtual image plane associated with the focus state. In other embodiments, the user interface can use other types of user interface controls such as dials, menus or slide bars to select the desired focus state 715.

A define ray bundles for each output pixel step 720 is used to define ray bundles 725 for each refocused image pixel of the refocused image 745 corresponding to the designated focus state 715. The ray bundles 725 include a plurality of imaging rays directed from the aperture of the imaging lens 410 (FIG. 5) to the refocused image pixel position for the virtual image plane.

A determine corresponding image pixels step 730 is used to determine image pixels 735 in the refocusable image 705 corresponding to each of the imaging rays in the ray bundles 725. This step works by identifying the lenslet and associated aperture image corresponding to the ray position and the image pixel within the aperture image corresponding to the ray direction.

A determine refocused image step 740 determines the refocused image 745 from the refocusable image 705. In a preferred embodiment, a refocused image pixel value for each refocused image pixel of the refocused image 745 is determined by combining the digital image data for the determined image pixels 735 in the refocusable image 705. For example, the pixels values for the determined image pixels 735 can be averaged to determine the refocused image pixel value.

In some embodiments, an optional preview refocused image step 750 is used to display the determined refocused image 745 on a soft-copy display (e.g., the image display 32 of FIG. 1). The user can then make a decision to accept and save the refocused image 745, or can optionally use a designate new focus state step 755 to update the focus state 715.

The invention has been described in detail with particular reference to certain preferred embodiments thereof, but it will be understood that variations and modifications can be effected within the spirit and scope of the invention.

| PARTS LIST | |
|---|---|
| 2 | flash |
| 4 | lens |
| 6 | adjustable aperture and adjustable shutter |
| 8 | zoom and focus motor drives |
| 10 | digital camera |
| 12 | timing generator |
| 14 | image sensor |
| 16 | ASP and A/D Converter |
| 18 | buffer memory |
| 20 | processor |
| 22 | audio codec |
| 24 | microphone |
| 26 | speaker |
| 28 | firmware memory |
| 30 | image memory |
| 32 | image display |
| 34 | user controls |
| 36 | display memory |
| 38 | wired interface |
| 40 | computer |
| 44 | video interface |
| 46 | video display |
| 48 | interface/recharger |
| 50 | wireless modem |
| 52 | radio frequency band |
| 58 | wireless network |
| 70 | Internet |
| 72 | photo service provider |
| 90 | white balance setting |
| 95 | white balance step |
| 100 | color sensor data |
| 105 | noise reduction step |
| 110 | ISO setting |
| 115 | demosaicing step |
| 120 | resolution mode setting |
| 125 | color correction step |
| 130 | color mode setting |
| 135 | tone scale correction step |
| 140 | contrast setting |
| 145 | image sharpening step |
| 150 | sharpening setting |
| 155 | image compression step |
| 160 | compression mode setting |
| 165 | file formatting step |
| 170 | metadata |
| 175 | photography mode settings |
| 180 | digital image file |
| 185 | camera settings |
| 200 | plenoptic camera |
| 205 | imaging lens |
| 210 | nominal object plane |
| 215 | microlens array |
| 220 | sensor array |
| 225 | ray sensor |
| 230 | imaging ray |
| 232 | imaging ray |
| 234 | imaging ray |
| 240 | sensor pixel |
| 242 | sensor pixel |
| 244 | sensor pixel |
| 250 | pixel position |
| 252 | ray bundle |
| 254 | ray bundle |
| 256 | ray bundle |
| 264 | virtual sensor location |
| 266 | virtual sensor location |
| 400 | digital imaging system |
| 405 | camera body |
| 410 | imaging lens |
| 415 | lens body |
| 420 | sensor array |
| 425 | lens element |
| 430 | microlens array |
| 435 | mounting bracket |
| 440 | glass plate |
| 445 | switchable optical module |
| 450 | light rays |
| 460 | focus point |

-continued

PARTS LIST

| | |
|---|---|
| 560 | focus point |
| 600 | digital imaging system |
| 605 | camera body |
| 610 | imaging lens |
| 615 | lens barrel |
| 620 | sensor array |
| 625 | lens elements |
| 630 | light rays |
| 635 | focus point |
| 640 | plenoptic adaptor |
| 645 | adaptor body |
| 650 | microlens array |
| 655 | lens mount interface |
| 660 | focus point |
| 670 | digital imaging system |
| 675 | plenoptic lens unit |
| 680 | lens housing |
| 685 | digital imaging system |
| 690 | focus point |
| 700 | capture refocusable image step |
| 705 | refocusable image |
| 710 | designate focus state step |
| 715 | focus state |
| 720 | define ray bundles for each output pixel step |
| 725 | ray bundles |
| 730 | determine corresponding image pixels step |
| 735 | image pixels |
| 740 | determine refocused image step |
| 745 | refocused image |
| 750 | preview refocused image step |
| 755 | designate new focus state step |

The invention claimed is:

1. A digital camera system configurable to operate in a low-resolution refocusable mode and a high-resolution non-refocusable mode comprising:
   a camera body;
   an image sensor mounted in the camera body having a plurality of sensor pixels for capturing a digital image;
   a removable imaging lens for forming an image of a scene onto an image plane, the imaging lens having an imaging lens aperture; and
   an adaptor that can be inserted between the imaging lens and the image sensor to provide the low-resolution refocusable mode and can be removed to provide the high-resolution non-refocusable mode, the adaptor including: a microlens array with a plurality of microlenses, a first lens mounting interface for mounting the adaptor to the camera body, and a second lens mounting interface for mounting the removable image lens to the adaptor;
   wherein, when the adaptor is inserted to provide the low-resolution refocusable mode, the microlens array is positioned between the imaging lens and the image sensor.

2. The digital camera system of claim 1 wherein when the adaptor is inserted to provide the low-resolution refocusable mode the image plane of the imaging lens is located substantially coincident with the microlens array and the microlens array is positioned to image the imaging lens aperture onto the image sensor such that different sensor pixels capture light from different portions of the imaging lens aperture.

3. The digital camera system of claim 1 wherein when the adaptor is removed to provide the high-resolution non-refocusable mode the image plane of the imaging lens is located substantially coincident with the image sensor.

4. The digital camera system of claim 1 wherein the removable imaging lens is adapted to be connected to the camera body using a lens mount mechanism, and wherein the first and second lens mounting interfaces of the adaptor comprise corresponding lens mount mechanisms for connecting the adaptor to both the camera body and the removable imaging lens.

5. The digital camera system of claim 4 wherein the lens mount mechanisms each comprise at least one of: a screw-threaded mechanism, a bayonet-type mechanism, or a friction-lock-type mechanism.

6. The digital camera system of claim 1 further including:
   a data processing system; and
   a program memory communicatively connected to the data processing system and storing instructions configured to cause the data processing system to form a refocused digital image having a particular focus state from digital image data captured using the image sensor when the digital camera system is configured to operate in the low-resolution refocusable mode.

7. The digital camera system of claim 6 wherein the refocused digital image includes a plurality of refocused image pixels, and wherein a pixel value for each refocused image pixel is determined by combining the digital image data for a set of captured image pixels corresponding to the particular focus state.

8. The digital camera system of claim 7 wherein the set of captured image pixels corresponding to the particular focus state is determined by:
   defining a ray bundle corresponding to a refocused image pixel position on a virtual image plane corresponding to the particular focus state, the ray bundle including a plurality of imaging rays directed from positions in the imaging lens aperture toward the refocused image pixel position on the virtual image plane; and
   determining the set of captured image pixels that capture light corresponding to the imaging rays.

9. The digital camera system of claim 6 wherein the particular focus state is selected by a user using a user interface system.

10. The digital imaging system of claim 9 wherein the user interface system displays a preview of the refocused digital image to the user during the process of selecting the particular focus state.

11. The digital imaging system of claim 6 wherein the refocused digital image is stored in a processer-accessible image memory.

12. The digital imaging system of claim 1 wherein the digital image data captured using the image sensor when the digital imaging system is configured to operate in the low-resolution refocusable mode is stored in a processer-accessible image memory, and wherein a refocused digital image is determined from the stored digital image data at a later time.

13. The digital imaging system of claim 12 wherein the stored digital image data is transferred to a separate computer system that determines the refocused digital image.

14. An adaptor for use with a digital camera system, the digital camera system including a camera body, an image sensor mounted in the camera body having a plurality of sensor pixels for capturing a digital image, and a removable imaging lens for forming an image of a scene onto an image plane, wherein the imaging lens has an aperture and is attachable to the camera body using a lens mounting interface such that the image plane is substantially coincident with the image sensor thereby providing a high-resolution non-refocusable imaging mode, the adaptor being useful for providing a low-resolution refocusable imaging mode and comprising:
   an adaptor body having a first lens mounting interface for mounting the adaptor body to the camera body and a second lens mounting interface for mounting the removable image lens to the adaptor body; and a microlens array with a plurality of microlenses mounted in the adaptor body;

wherein the adaptor can be inserted between the imaging lens and the camera body such that the microlens array is positioned between the imaging lens and the image sensor to provide the low-resolution refocusable mode.

15. The digital camera system of claim 14 wherein when the adaptor is inserted between the imaging lens and the camera body to provide the low-resolution refocusable mode the image plane of the imaging lens is located substantially coincident with the microlens array and the microlens array is positioned to image the imaging lens aperture onto the image sensor such that different sensor pixels capture light from different portions of the imaging lens aperture.

* * * * *